US008547276B2

(12) United States Patent
Cole et al.

(10) Patent No.: US 8,547,276 B2
(45) Date of Patent: Oct. 1, 2013

(54) POSITIONING SYSTEM AND METHOD

(75) Inventors: Anthony Cole, Kingsford (AU);
William James Kellar, Dutton Park (AU)

(73) Assignee: Leica Geosystems AG, Heerbrugg (CH)

( * ) Notice: Subject to any disclaimer, the term of this patent is extended or adjusted under 35 U.S.C. 154(b) by 493 days.

(21) Appl. No.: 12/680,358

(22) PCT Filed: Sep. 26, 2008

(86) PCT No.: PCT/AU2008/001438
§ 371 (c)(1),
(2), (4) Date: Nov. 16, 2010

(87) PCT Pub. No.: WO2009/039587
PCT Pub. Date: Apr. 2, 2009

(65) Prior Publication Data
US 2011/0050488 A1    Mar. 3, 2011

(30) Foreign Application Priority Data

Sep. 28, 2007 (AU) ................................. 2007905327

(51) Int. Cl.
*G01S 19/45* (2010.01)
*G01S 19/47* (2010.01)
(52) U.S. Cl.
CPC ... *G01S 19/45* (2013.01); *G01S 19/47* (2013.01)
USPC ................................. 342/357.28; 342/357.3
(58) Field of Classification Search
USPC .......................................... 342/357.28, 357.3
See application file for complete search history.

(56) References Cited

U.S. PATENT DOCUMENTS

| 6,449,559 | B2 | 9/2002 | Lin | |
| 6,496,778 | B1 | 12/2002 | Lin | |
| 6,721,657 | B2 | 4/2004 | Ford et al. | |
| 6,750,816 | B1 * | 6/2004 | Kunysz | 342/357.59 |
| 6,801,855 | B1 * | 10/2004 | Walters et al. | 701/410 |
| 6,982,669 | B2 | 1/2006 | Coatantiec et al. | |
| 2004/0189515 | A1 * | 9/2004 | Vannucci | 342/357.01 |
| 2007/0109185 | A1 * | 5/2007 | Kracke et al. | 342/357.09 |

FOREIGN PATENT DOCUMENTS

| JP | 2007-218865 A | 8/2007 |
| JP | 2007-218865 A1 | 8/2007 |

OTHER PUBLICATIONS

European Search Report dated Jul. 2, 2012 as received in application No. 08 800 073.2.
Paielli, "Range Filtering for Sequential GPS Receivers with External Sensor Augmentation", NASA Technical Memorandum 89418, Ames Research Center, Apr. 1987, 22pgs.
Search Report dated Oct. 27, 2011 as received in application No. EP 08 80 0073.

\* cited by examiner

*Primary Examiner* — Gregory C Issing
(74) *Attorney, Agent, or Firm* — Maschoff Brennan

(57) ABSTRACT

A positioning method whereby inertial positioning data is calculated based upon measurements of an Inertial Navigation System. Virtual satellite ranging data is then generated based upon the inertial positioning data. The virtual satellite ranging data is then combined with received satellite ranging data from one or more satellites forming part of a Global Navigation Satellite System (GNSS). A GNSS positioning solution is then calculated based upon the combined received satellite ranging data and the virtual satellite ranging data.

11 Claims, 4 Drawing Sheets

POSITIONING SYSTEM AND METHOD

FIELD OF THE INVENTION

The present invention relates to a positioning system and method. In particular, the invention relates to a positioning method and system integrating measurements from Global Navigation Satellite Systems (GNSS) and Inertial Navigation Systems (INS).

BACKGROUND TO THE INVENTION

Many applications use methods and systems for position determination, e.g. of a geodetic instrument, a vehicle or the like, which are based on global positioning systems, such as, for example, GPS, GLONASS or the European Galileo system. These Global Navigation Satellite Systems (GNSS) are based on the reception of satellite signals.

The requirements of vehicle guidance or navigation, e.g. in agricultural, mining, trucking or railroad applications, have subtle differences to those of surveying, including a much stronger requirement for continuously available positioning. However, the ability to provide continuously available positioning is impaired when there is poor satellite "visibility" or one or more of the satellites are inoperative, which results in the accuracy of the position determination being degraded. For example, GPS systems require at least four satellites to be "visible" to enable precise position determination.

It is well known in the art to integrate positioning measurements from GNSS data with data from one or more vehicle-mounted Inertial Navigation Systems (INS) to provide improved position determination systems and methods with high reliability, availability, accuracy and integrity. Such systems are commonly referred to in the art as Integrated Navigations Systems.

An INS provides the position, velocity, orientation, and angular velocity of a vehicle by measuring the linear and angular accelerations applied to the system in an inertial reference frame.

In many Integrated Navigation Systems, Kalman Filters are used to generate an estimate of a trajectory and to allow vehicle guidance in real-time. A Kalman Filter is a recursive estimator that relies on an estimated state from a previous step and current measured data to calculate an estimate for a current state along with an explicit measure of confidence in this estimate.

As such, Integrated Navigation Systems require post processing of both the GNSS data which, in a GPS system, occurs on the output from the GPS receiver, and the positioning data obtained from the INS to provide positioning information.

In this specification, the terms "comprises", "comprising", "includes", "including" or similar terms are intended to mean a non-exclusive inclusion, such that a method, system or apparatus that comprises a list of elements does not include those elements solely, but may well include other elements not listed.

SUMMARY OF THE INVENTION

In one form, although it need not be the broadest form, the invention resides in a positioning method including the steps of:

(i) calculating inertial positioning data based upon measurements of an Inertial Navigation System;

(ii) generating virtual satellite ranging data based upon the inertial positioning data;

(iii) combining received satellite ranging data received from one or more satellites forming part of a Global Navigation Satellite System (GNSS) with the virtual satellite ranging data; and (iv) calculating a GNSS positioning solution based upon the combined received satellite ranging data and the virtual satellite ranging data.

Further features of the invention will become apparent from the following detailed description.

BRIEF DESCRIPTION OF THE DRAWINGS

By way of example only, preferred embodiments of the invention will be described more fully hereinafter with reference to the accompanying drawings, wherein.

DETAILED DESCRIPTION OF THE INVENTION

The invention will be described with reference to a GPS GNSS for guidance of an agricultural vehicle. However, a skilled person will appreciate that the system is applicable utilizing any known GNSS for any known guidance application.

The positioning system and method of the invention converts INS positioning data into a data form that is able to be input into a processing module of a GPS receiver such that the GPS receiver is able to process the converted INS positioning data as GPS ranging data. By transforming the INS data to represent that data as GPS ranging data, the GPS processing module is able to seamlessly provide positioning data that utilizes traditional GPS range processing techniques augmented with INS positioning data.

Figure 1:
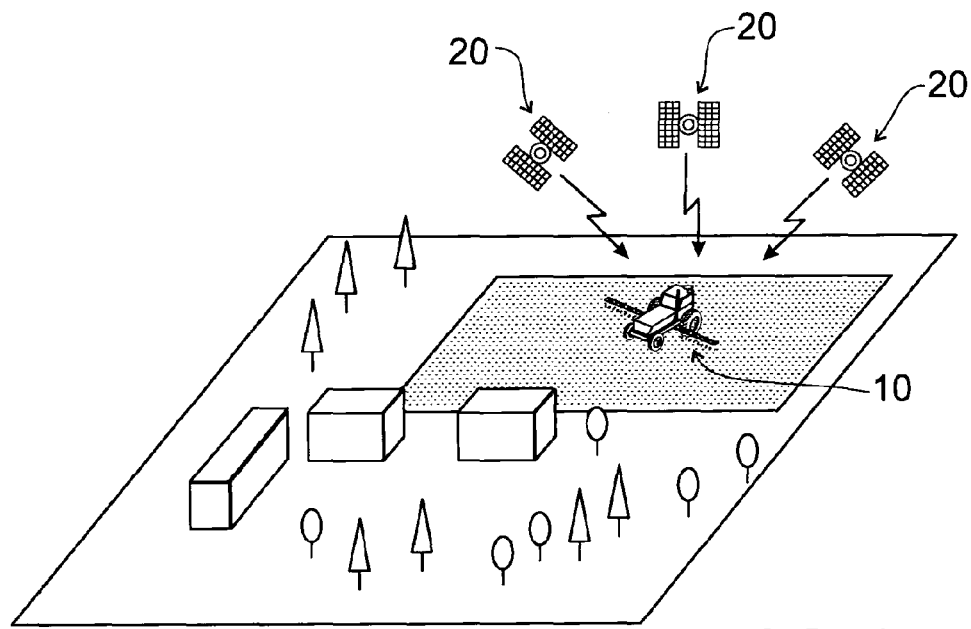
FIG. 1 shows a schematic view of a vehicle utilizing a GNSS to navigate.
Figure 2:
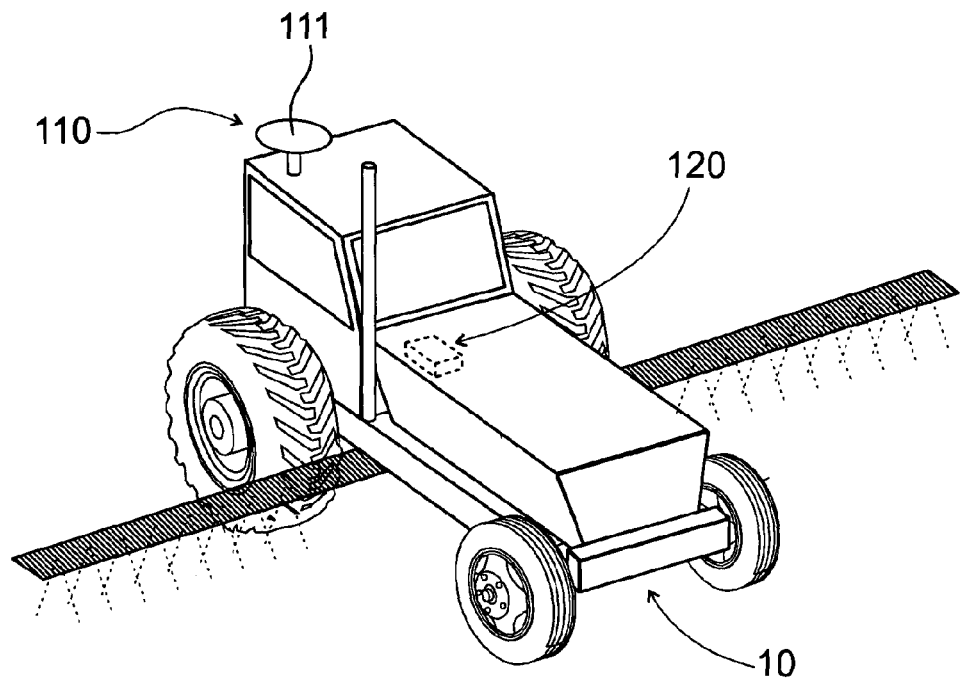
FIG. 2 shows a schematic view of the vehicle shown in FIG. 1.

FIG. 1 shows a schematic view of a vehicle 10 utilizing a GNSS to navigate and FIG. 2 shows a schematic view of vehicle 10. In the embodiment, the vehicle 10 is used for cultivation of soil on farmland. In order that cultivation occurs in a precise manner, the actual position of the vehicle, or a point thereof, is derived using ranging signals from satellites 20.

As such, the vehicle 10 has located thereon a GPS receiver 110 having an antenna 111 for receiving GPS signals from satellites 20. An INS 120 is mounted on or within the vehicle 10 for generating inertial positioning data in respect of the vehicle 10 as is known in the art. The INS 120 is preferably in the form of a accelerometer working in combination with an angular rate sensor and associated computational devices. However, a skilled person will appreciate that the INS 120 may be in the form of any known Inertial navigation System.

Figure 3:
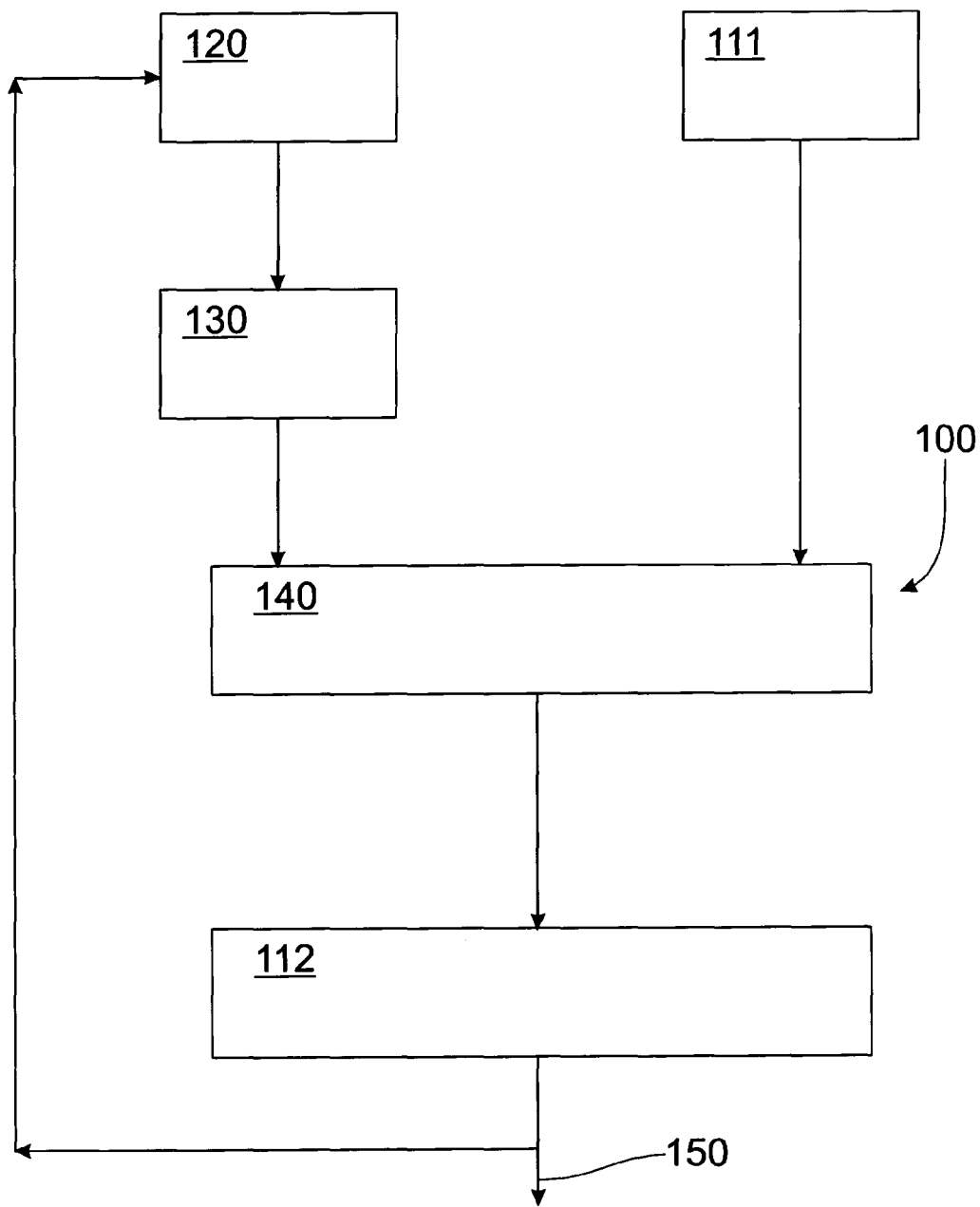
FIG. 3 shows a schematic representation of a positioning system according to an embodiment of the invention.

FIG. 3 shows a schematic representation of a positioning system 100 according to an embodiment of the invention. Positioning system 100 comprises GPS receiver antenna 111, INS 120, translation module 130, augmentation module 140 and GPS processing module 112.

INS 120 is able to provide inertial positioning data in the form of position data, velocity data, orientation data and angular acceleration data in respect of vehicle 10 in an inertial reference frame.

The INS 120 is in communication with translation module 130. Translation module 130 is able to receive the inertial positioning data generated by the INS 120 and translate that inertial positioning data to virtual satellite ranging data as will be discussed in greater detail below. Translation module 130 is in communication with augmentation module 140.

GPS receiver antenna 111 receives satellite ranging data communicated from visible satellites 20 as is known in the art. The satellite ranging data is communicated to augmentation module 140.

As discussed, augmentation module 140 receives virtual satellite ranging data from translation module 130 and satellite ranging data from GPS receiver antenna 111. Augmentation module 140 combines the virtual satellite ranging data from the translation module 130 and the satellite ranging data from GPS receiver antenna 111 and communicates combined satellite ranging data to GPS processing module 112. Augmentation module 140 will be discussed in greater detail below.

GPS processing module 112 is configured to receive the combined satellite ranging data from the augmentation module 140 and perform positioning calculation on this data in order to provide a positioning solution (150) that is able to be utilized as is known in the art.

In a preferred form, the translation module 130, the augmentation module 140 and the GPS processing module 112 are software modules executing in a computing device of GPS receiver 110. In this form, GPS receiver 110 is in the form of any known GPS receiver that has had proprietary software, in the form of translation module 130 and augmentation module 140, installed thereon.

Alternatively, translation module 130 may be in the form of a hardware module or hardware and software module separate from GPS receiver 110 and in communication with GPS processing module 112 of GPS receiver 110.

Furthermore, augmentation module 140 may be in the form of a hardware module or a hardware and software module separate from GPS receiver 110 and in communication with GPS processing module 112 of GPS receiver 110.

Figure 4:
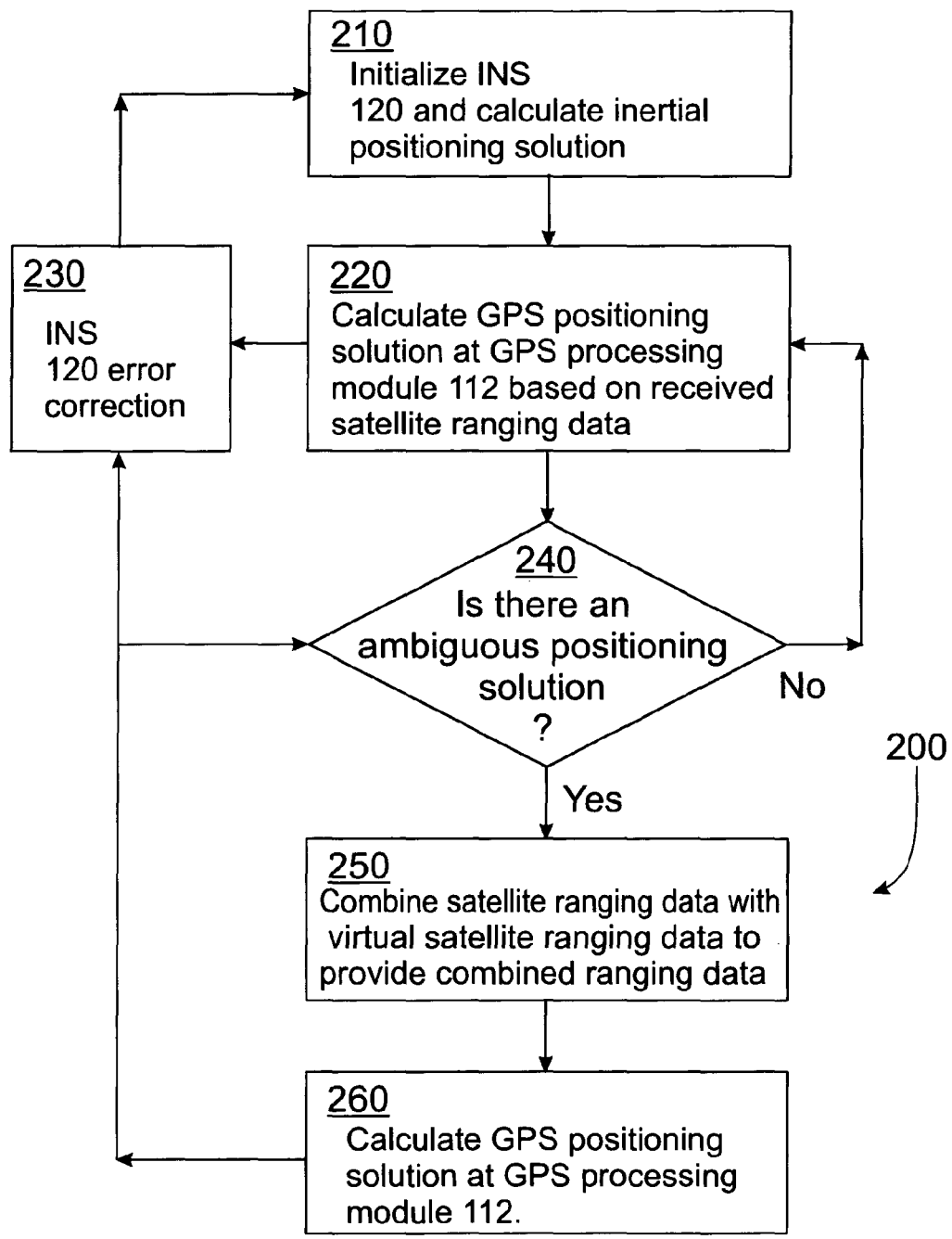
FIG. 4 shows a positioning method according to an embodiment of the invention.

FIG. 4 shows a positioning method 200 according to an embodiment of the invention. In this embodiment, positioning method 200 provides virtual satellite ranging data to processing module 112 of GPS receiver 110 when the positioning solution becomes ambiguous. As is known in the art, a trivial situation when the positioning solution becomes ambiguous is when the GPS antenna 111 receives satellite ranging data from less than 4 satellites 20.

Positioning method 200 commences by initializing the INS 120 (step 210).

The INS 120 is initialized by GPS processing module 112 of GPS receiver 110 based on a positioning solution calculated from satellite ranging signals received by GPS antenna 111 of GPS receiver 110. In this initialization step, the GPS antenna 111 is able to receive satellite ranging signals from at least four satellites 20 in order that the GPS processing module 112 is able to calculate an unambiguous three-dimensional positioning solution and also solve for the clock bias of the GPS receiver 110.

As mentioned, the positioning solution calculated by the GPS processing module 112 of the GPS receiver 110 is communicated to the INS 120 such that the INS 120 has an initial position to begin calculating an inertial positioning solution as is known in the art.

Suitably, the step of initializing the INS 120 is conducted at vehicle 10 start up prior to movement thereof.

The GPS processing module 112 of the GPS receiver 110 then calculates a GPS positioning solution for the vehicle 10 based upon satellite ranging data (step 220) received by GPS antenna 111 as discussed above.

As the vehicle 10 moves, the GPS processing module 112 of the GPS receiver 110 continues to calculate a GPS positioning solution for the vehicle 10 based upon satellite ranging data received at GPS antenna 111 from visible satellites 20.

As the vehicle 10 moves, the GPS positioning solution calculated by the GPS processing module 112 is communicated to the INS 120 to correct errors in the inertial positioning solution calculated by the INS 120 (step 230).

As is known in the art, inertial positioning solutions are subject to errors that grow with respect to time. As such, by communicating the GPS positioning solution calculated by the GPS processing module 112 of the GPS receiver 110 to the INS 120 the extent of the error of the inertial positioning solution calculated by the INS 120 is minimized.

Suitably, step 230 is conducted at each epoch in order to minimize the error growth of the positioning solution calculated by the INS 120.

The GPS processing module 112 of the GPS receiver 110 continuously determines whether an ambiguous positioning solution exists (step 240). Suitably, the GPS processing module 112 undertakes this determination at each epoch.

For example, as the vehicle 10 moves to a position whereby one or more of satellites 20 are no longer visible such that the GPS antenna 111 is unable to receive satellite ranging data from one or more of the satellites 20, the positioning solution calculated by the GPS processing module 112 becomes ambiguous. As mentioned above, ambiguity occurs when the GPS processing module 112 is unable to calculate for four variables based on satellite ranging data received from less than four satellites 20.

If the positioning solution is not ambiguous then the method returns to step 220 and the GPS processing module 112 continues to calculate a GPS positioning solution based on the satellite ranging data received at the GPS antenna 111.

However, if the positioning solution becomes ambiguous, as discussed above, the augmentation module 140 combines inertial positioning data calculated by the INS 120 and translated to virtual satellite ranging data by translation module 140, and satellite ranging data received at GPS antenna 111 from visible satellites 20 (step 250).

The inertial positioning data calculated by the INS measurement module 120 is translated in such a way that that data is communicated to the GPS processing module 112, augmented with actual satellite ranging data received at GPS antenna 111, such that the GPS processing module 112 calculates the positioning solution using standard GPS positioning calculation techniques as if the GPS antenna 111 had received a satellite ranging signal from each of the four satellites 20 in order to calculate an un-ambiguous positioning solution.

Step 250 is discussed in greater detail below with reference to FIG. 5.

The GPS processing module 112 then calculates a GPS positioning solution as discussed previously (step 260).

As before, the GPS positioning solution calculated by the GPS processing module 112 is communicated to the INS 120 in order to correct any time dependent error growth in the inertial positioning solution calculated by the INS 120 (step 230).

Furthermore, the GPS processing module 112 again determines whether an ambiguous positioning solution exists based on satellite ranging data received at antenna 111 and the method continues based upon the determination step 240.

Figure 5:
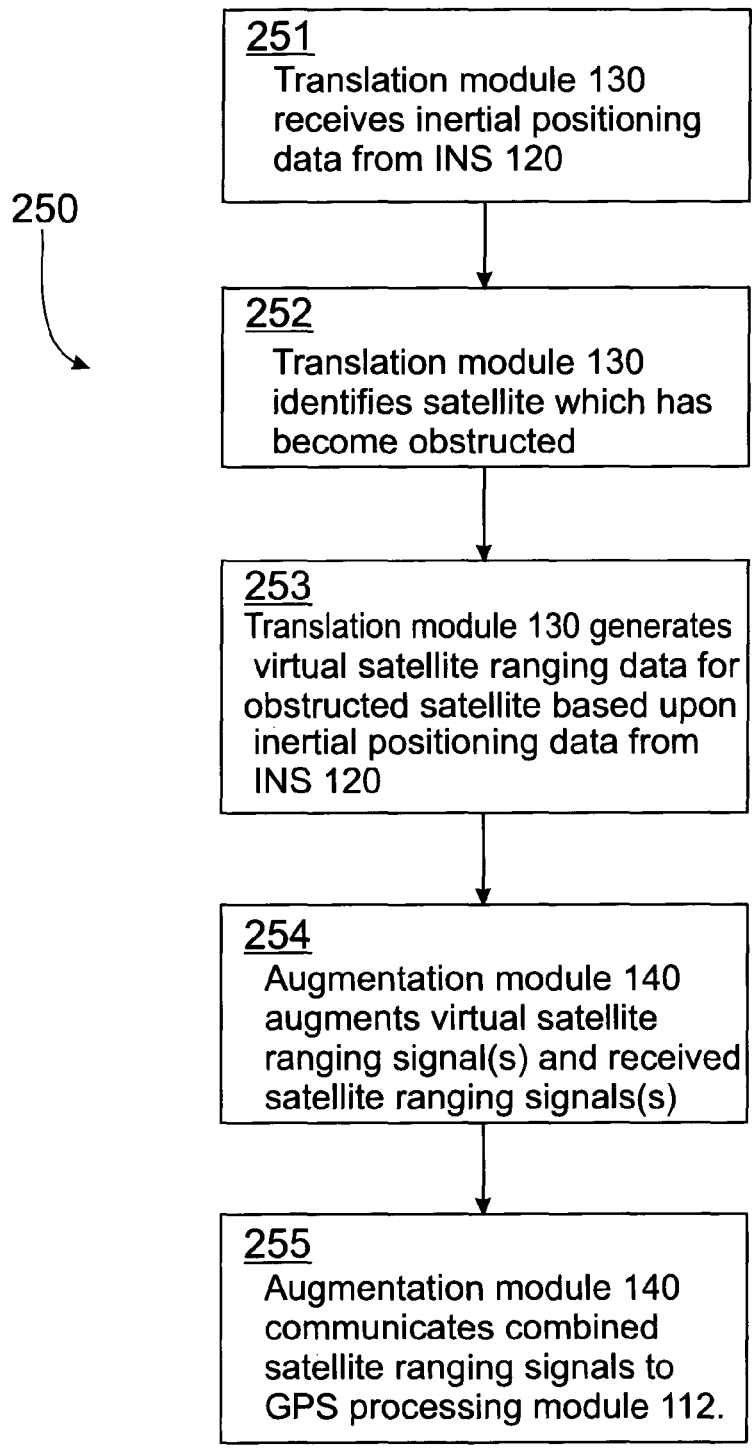
FIG. 5 shows a method of translating inertial positioning data and augmenting that data with satellite ranging data forming part of the positioning method shown in FIG. 4.

FIG. 5 shows a method 250 of translating inertial positioning data and augmenting that data with satellite ranging data forming part of the positioning method 200 according to an embodiment of the invention.

As discussed above, method 250 commences when GPS processing module 112 determines that an ambiguous positioning solution exists based on satellite ranging data received at GPS antenna 111.

Translation module 130 receives the inertial positing data from the INS 120 calculated for the epoch immediately prior to the epoch in which an ambiguous positioning solution is calculated (step 251). This data is able to provide an inertial positing solution for the vehicle 10 independent of any positioning solution calculated by the GPS processing module 112 based upon satellite ranging data received by the GPS antenna 111.

The translation module 130 then identifies which of the four satellites 20 has become obstructed (step 252) and the translation module 130 then generates virtual satellite ranging data based upon the inertial positioning solution calculated by the INS 120 (step 253).

That is, based upon the inertial positioning solution calculated by the INS 120, the translation module 130 generates virtual satellite ranging data such that the virtual satellite ranging data is identical in form to satellite ranging data of the obstructed satellite had that satellite not been obstructed.

As such, the virtual satellite ranging data generated by translation module 130 includes identification data associated with the obstructed satellite for communication to the GPS processing module 112.

Optionally, the translation module 130 injects atmospheric errors into the virtual satellite ranging data. Often, GPS receivers use a mathematical model to correct for atmospheric errors present in received satellite ranging data. Hence, by injecting these modeled errors into the virtual satellite ranging data, the virtual satellite ranging data will be processed with the received satellite ranging data in the same manner and have these injected errors corrected by the GPS processing module 112.

The virtual satellite ranging data generated by the translation module 130 is then communicated to augmentation module 140 and augmentation module 140 then augments the virtual satellite ranging data generated by translation module 130 with satellite ranging data received by GPS antenna 111 (step 254).

Suitably, the augmentation module 140 combines the received satellite ranging data with the generated virtual satellite ranging data to create combined satellite ranging data.

The combined satellite ranging data is then communicated to the GPS processing module 112 of the GPS receiver 110 (step 255) and the GPS processing module 112 then calculates a GPS positioning solution as discussed above.

The embodiment of the positioning method 100 of the invention described above is implemented when a satellite becomes obstructed whereby the virtual satellite ranging data is used to replace satellite ranging data of a satellite that has become temporarily obstructed. The inventors have recognized that the positioning method of the invention may be embodied to generate virtual satellite ranging data in respect of truly virtual satellites.

That is, the augmentation module 130 is able to edit the almanac and ephemeris of the GPS receiver 110 in order that the GPS receiver will validly accept ranging signals from sources other than the 32 satellites in the GPS constellation. As such, the method and system of the invention allows generation of a GPS positing solution based upon satellite ranging data received from an actual satellite constellation and virtual satellite ranging data manipulated to appear that each virtual satellite ranging data is generated from a satellite in a virtual satellite constellation.

In this embodiment of the invention, the determination step 240 from method 200 is removed such that the GPS receiver receives combined satellite ranging data comprised of both satellite ranging data received by GPS antenna 111 and virtual satellite ranging data. Suitably, virtual satellite ranging data suitably includes virtual ranging data from one or more virtual satellites, the orbit and identification of which have previously been stored in the almanac of the GPS receiver 110 by the augmentation module 140.

This embodiment of the invention is applicable even when a unambiguous positioning solution is able to be calculated by the GPS processing module 112 based on satellite ranging data received at GPS antenna 111. In this way, the virtual satellite ranging data allows the GPS processing module 112 to calculate a positioning solution half way between every epoch in order to provide twice the amount of positioning calculations per unit time at the GPS processing module 112 when compared with positing calculations based upon satellite ranging data alone.

A particular advantage of this embodiment of the invention is that the virtual satellites may be placed in an orbit that minimizes the dilution of precision of the GPS satellite and virtual satellite constellation.

Whilst the positioning method and system of the invention has been described above with reference to a GPS receiver mounted upon a moving vehicle. Persons skilled in the art will appreciate that the method and system may be similarly applied to applications whereby a fixed position GPS reference station is used in combination with a mobile GPS receiver to conduct positioning solutions.

Throughout the specification the aim has been to describe the present invention without limiting the invention to any one embodiment or specific collection of features. Persons skilled in the relevant art may realize variations from the specific embodiments that will nonetheless fall within the scope of the present invention.

The invention claimed is:

1. A positioning method including the steps of:
   (i) calculating inertial positioning data based upon measurements of an Inertial Navigation System;
   (ii) generating virtual satellite ranging data based upon the inertial positioning data, including the steps of:
      (a) identifying one or more obstructed satellites forming part of the GNSS wherein satellite ranging data from the one or more obstructed satellites is not received;
      (b) translating the inertial positioning data to form the virtual satellite ranging data such that the virtual satellite ranging data is identical in form to satellite ranging data from the one or more obstructed satellites;
   (iii) combining received satellite ranging data from one or more satellites forming part of a Global Navigation Satellite System (GNSS) with the virtual satellite ranging data; and
   (iv) calculating a GNSS positioning solution based upon the combined received satellite ranging data and the virtual satellite ranging data.

2. The positioning method of claim 1, wherein an almanac and an ephemeris of a GPS receiver is modified to accept virtual ranging data from one or more virtual satellites not forming part of any GNSS constelation, the step of generating virtual satellite ranging data based upon the inertial positioning data includes the step of:

translating the inertial positioning data to form the virtual satellite ranging data such that the virtual satellite ranging data corresponds with the modified almanac and ephemeris of the GPS receiver.

3. The positioning method of claim 2, wherein the almanac and the ephemeris of the GPS receiver is modified such that the one or more virtual satellites are placed in an orbit to allow the calculation of the GNSS positioning solution to occur half way between consecutive epochs of positioning calculations based upon satellite ranging data alone.

4. The positioning method of claim 1, further including the step of: utilizing the calculated GNSS positioning solution to correct errors in the inertial positioning data.

5. The positioning method of claim 1, further including the step of adjusting the generated virtual satellite ranging data to include atmospheric errors prior to combing the virtual satellite ranging data with the received satellite ranging data.

6. A positioning system comprising:
an inertial navigation system adapted to calculate inertial positioning data;
a GPS system having a processing module, the GPS system adapted to receive satellite ranging data and calculate a GNSS positioning solution based upon the received satellite ranging data;
a translation module in communication with the inertial navigation system, the translation module adapted to receive the inertial positioning data and translate the inertial positioning data into virtual satellite ranging data including virtual ranging data from one or more virtual satellites, wherein the translation module:
(a) identifies one or more obstructed satellites forming part of the GNSS wherein satellite ranging data from the one or more obstructed satellites is not received; and
(b) translates the inertial positioning data to form the virtual satellite ranging data such that the virtual satellite ranging data is identical in form to satellite ranging data from the one or more obstructed satellites; and
an augmentation module in communication with the processing module of the GPS system and the translation module, the augmentation module adapted to receive the satellite ranging data from the GPS system and the virtual satellite ranging data from the translation module to form combined ranging data and communicate the combined ranging data to the processing module of the GPS system;
wherein the processing module of the GPS system calculates a positioning solution based upon the combined ranging data received from the augmentation module.

7. The positioning system of claim 6, wherein the processing module of the GPS system is adapted to communicate the calculated positioning solution to the inertial navigation system.

8. The positioning system of claim 7, wherein the inertial navigation system is adapted to correct errors in the calculated positioning data based upon the positioning received from the processing module of the GPS system.

9. The positioning system of claim 6, wherein the translation module adjusts the generated virtual satellite ranging data to include modeled atmospheric errors.

10. The positioning system of claim 6, wherein an almanac and an ephemeris of a GPS receiver is modified to accept virtual ranging data from one or more virtual satellites not forming part of any GNSS constellation.

11. The positioning system of claim 10, wherein the almanac and the ephemeris of the GPS receiver is modified such that the one or more virtual satellites are placed in an orbit to allow the calculation of the GNSS positioning solution to occur half way between consecutive epochs of positioning calculations based upon satellite ranging data alone.

* * * * *

UNITED STATES PATENT AND TRADEMARK OFFICE
CERTIFICATE OF CORRECTION

PATENT NO.       : 8,547,276 B2                                                                 Page 1 of 1
APPLICATION NO.  : 12/680358
DATED            : October 1, 2013
INVENTOR(S)      : Cole et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this
Fifteenth Day of September, 2015

Michelle K. Lee
*Director of the United States Patent and Trademark Office*